(12) United States Patent
Bastani et al.

(10) Patent No.: US 8,122,036 B2
(45) Date of Patent: Feb. 21, 2012

(54) METHOD AND APPARATUS FOR GENERATING CUSTOMIZED MAPS

(75) Inventors: Ali Bastani, Branchburg, NJ (US); David Belanger, Hillsborough, NJ (US); Sam Parker, Cranbury, NJ (US); Sarat Puthenpura, Berkeley Heights, NJ (US); Phyllis Weiss, Englewood, NJ (US); Wenjie Zhao, Princeton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 179 days.

(21) Appl. No.: 11/450,820

(22) Filed: Jun. 9, 2006

(65) Prior Publication Data
US 2007/0288509 A1    Dec. 13, 2007

(51) Int. Cl.
G06F 7/00    (2006.01)

(52) U.S. Cl. ........ 707/758; 707/919; 701/208; 340/988; 340/995.1; 340/539.2

(58) Field of Classification Search ................. None
See application file for complete search history.

(56) References Cited

U.S. PATENT DOCUMENTS

| | | | |
|---|---|---|---|
| 5,848,373 A | 12/1998 | DeLorme et al. | |
| 5,878,421 A | 3/1999 | Ferrel et al. | |
| 5,990,886 A * | 11/1999 | Serdy et al. ................. | 715/752 |
| 6,014,629 A * | 1/2000 | DeBruin-Ashton ............. | 705/2 |
| 6,125,327 A * | 9/2000 | Kalenian .......................... | 702/3 |
| 6,459,782 B1 * | 10/2002 | Bedrosian et al. ....... | 379/201.08 |
| 6,542,593 B1 | 4/2003 | Bowman-Amuah | |
| 6,564,209 B1 | 5/2003 | Dempski et al. | |
| 6,571,279 B1 | 5/2003 | Herz et al. | |
| 6,980,631 B1 * | 12/2005 | Danzl et al. ............. | 379/112.01 |
| 6,999,777 B1 * | 2/2006 | Ganesh ....................... | 455/456.1 |
| 7,079,945 B1 * | 7/2006 | Kaplan ........................ | 701/208 |
| 7,084,775 B1 * | 8/2006 | Smith .......................... | 340/601 |
| 2001/0044803 A1 * | 11/2001 | Szutu ........................ | 707/104.1 |
| 2002/0010666 A1 * | 1/2002 | Wright ........................... | 705/34 |
| 2003/0032404 A1 * | 2/2003 | Wager et al. .................. | 455/406 |
| 2004/0249565 A1 * | 12/2004 | Park .............................. | 701/200 |
| 2006/0010100 A1 * | 1/2006 | McAvoy et al. .................. | 707/2 |
| 2006/0238379 A1 * | 10/2006 | Kimchi et al. ............. | 340/995.1 |

OTHER PUBLICATIONS

PCT International Search Report corresponding to PCT Patent Application PCT/US 2007/012760 filed May 30, 2007 (2 pages).
PCT Written Opinion of the International Searching Authority corresponding to PCT Patent Application PCT/US 2007/012760 filed May 30, 2007 (10 pages).
PCT Notification of Transmittal of International Preliminary Report on Patentability (Chapter II of the Patent Cooperation Treaty) corresponding to PCT Patent Application PCT/US 2007/012760 filed May 30, 2007, mailed Oct. 28, 2009 (7 pages).
PCT Notification Concerning Transmittal of International Preliminary Report on Patentability (Chapter I of the Patent Cooperation Treaty) corresponding to PCT Patent Application PCT/US 2007/012760 filed May 30, 2007, mailed Dec. 24, 2008 (10 pages).

\* cited by examiner

*Primary Examiner* — Vei-Chung Liang

(57) ABSTRACT

A system and method for generating a map includes a database for storing a list of recipients and characteristics associated with each recipient in the list of recipients. The method and system also includes a control module for receiving a characteristic associated with at least one recipient in the list of recipients. The method and system also includes a rule engine for generating a map based at least in part on the characteristic associated with the at least one recipient using programmable rules.

18 Claims, 4 Drawing Sheets

Dear Customer A,
    The following map provides a quick reference to your local calling area. A call within your local calling area is covered by your local calling plan. — 408

404

From SACRAMENTO, calls to following local exchanges are covered by your local calling plan: — 412

| Area Code | Local Exchanges | Towns |
|---|---|---|
| 530 | 766 | SACRAMENTO |
| 916 | 239, 256, 263, 265, 274, 275, 283, 285, 286, 331, 332, 334, 338, 339, 344, 348, 349, 359, 418, 419, 437, 465, 470, 473, 480, 481, 482, 483, 484, 485, 486, 487, 488, 489, 515, 545, 561, 563, 564, 565, 566, 567, 568, 569, 570, 574, 575, 576, 595, 609, 613, 614, 640, 641, 643, 646, 648, 649, 679, 779, 830, 876, 920, 921, 922, 923, 924, 925, 927, 928, 929, 944, 971, 972, 973, 974, 977, 978, 979, 200, 225, 241, 308, 342, 390, 436, 459, 526, 534, 535, 536, 537, 671, 765, 768, 844, 847, 860, 863, 864, 866, 867, 880, 903, 904, 948, 961, 962, 965, 966, 967, 968, 969, 994, 237, 238, 243, 335, 347, 432, 468, 675, 796, 915, 943, 991, 992, 242, 245, 410, 560, 618, 676, 721, 722, 723, 725, 726, 727, 728, 729, 735, 745, 910, 201, 202, 203, 204, 205, 206, 207, 208, 212, 213, 214, 215, 216, 217, 219, 224, 227, 228, 229, 231, 233, 244, 246, 247, 249, 254, 255, 261, 262, 264, 266, 267, 277, 278, 281, 282, 284, 288, 290, 296, 307, 310, 313, 317, 319, 320, 321, 322, 323, 324, 325, 326, 327, 328, 329, 340, 341, 346, 360, 361, 362, 363, 364, 366, 368, 369, 371, 372, 373, 374, 375, 376, 379, 381, 382, 383, 384, 386, 387, 388, 391, 392, 393, 394, 395, 396, 397, 399, 401, 402, 403, 414, 416, 417, 420, 421, 422, 423, 424, 425, 427, 428, 429, 431, 433, 438, 440, 441, 442, 443, 444, 445, 446, 447, 448, 449, 450, 451, 452, 453, 454, 455, 456, 457, 463, 464, 466, 471, 475, 491, 492, 493, 494, 497, 498, 499, 501, 502, 503, 505, 506, 508, 519, 522, 523, 524, 529, 531, 533, 539, 541, 548, 549, 551, 552, 553, 554, 556, 557, 558, 559, 583, 588, 589, 590, 591, 592, 593, 594, 599, 600, 601, 602, 603, 606, 607, 610, 612, 615, 616, 617, 628, 631, 635, 636, 638, 642, 650, 651, 653, 654, 657, 658, 662, 669, 697, 698, 703, 704, 708, 709, 710, 712, 715, 716, 717, 718, 719, 720, 730, 731, 732, 733, 734, 736, 737, 739, 743, 747, 752, 760, 761, 762, 763, 764, 766, 767, 769, 795, 798, 799, 801, 802, 803, 804, 806, 807, 808, 810, 812, 813, 814, 815, 816, 819, 820, 821, 825, 826, 828, 829, 832, 833, 834, 835, 837, 838, 843, 845, 848, 849, 851, 852, 853, 854, 855, 856, 857, 858, 859, 861, 862, 868, 869 | ELK GROVE,FAIR OAKS SACRAMENTO), FOLSOM,MEADO (SWVIEW,RIO LINDA,ROSEVILLE, SACRAMENTO |

METHOD AND APPARATUS FOR GENERATING CUSTOMIZED MAPS

BACKGROUND OF THE INVENTION

The present invention relates generally to generating maps, and more specifically to generating maps that are customized for a user.

Companies, organizations, and groups often have a need to provide custom maps to its customers. For example, a company may want to provide a custom map to certain of its customers as a marketing promotion or a customized brochure.

The generation of geographic maps that are customized for particular customers is often a tedious process that typically involves a large amount of manual labor. As a result, the generation of customized maps has traditionally been a costly and time-intensive process that may limit the overall throughput of communications for an organization.

Further, the delivery of geographic maps to customers is often through a brochure. For example, a wireless telephone service provider often provides maps showing regions of coverage to its customers via a brochure that the service provider hands to its customers when the customer requests information about a service. A wireless telephone service provider may also mail a brochure to its customers, such as if the service provider has updated the areas of coverage for its customers on a particular plan.

BRIEF SUMMARY OF THE INVENTION

There remains a need to more efficiently produce and deliver maps that are customized for a particular recipient or recipients.

In accordance with the principles of one aspect of the present invention, maps may be custom generated, easily and rapidly, responsive to the needs of each customer. In one embodiment of the present invention, a method and system for generating a map includes a database for storing a list of recipients and characteristics associated with each recipient in the list of recipients. The method and system may also include a control module for receiving a characteristic associated with at least one recipient in the list of recipients. Examples of the predetermined characteristic include location data, revenue, product ownership, customer status, tenure with a particular company, organization, payment status, credit rating, and responses to previously sent material.

In a specific embodiment, the method and system may include a rule engine that enables the use of programmable rules to generate a map based at least in part on the characteristic associated with the at least one recipient. The rule engine includes a data validation and data processing module for validating and/or processing data associated with the map, and a mapping rule engine for generating the map. The rule engine may also include a maps database for storing the map generated by the rule engine. In yet another embodiment, the rule engine further includes a geo-processing module. The geo-processing module paints each layer of geo elements (e.g., lines, points, filled polygons, etc.) according to their corresponding geo coordinates (e.g., latitude or longitude) based on the maps rules specified.

Other embodiments of the invention may include: a map creation and disbursement rules database for storing data associated with the creation and disbursement of the map; a mapping attributes database for storing attributes of the map; a polygon generation module for generating at least one polygon for the map generation; and a communication module for communicating the map to the at least one recipient. The communication may be via email or via paper. The method and system can also receive feedback regarding the map.

These and other advantages of the invention will be apparent to those of ordinary skill in the art by reference to the following detailed description and the accompanying drawings.

BRIEF DESCRIPTION OF THE DRAWINGS

FIG. 4 is a diagram of a customized map output provided by the map generation system.

DETAILED DESCRIPTION

Figure 1A:
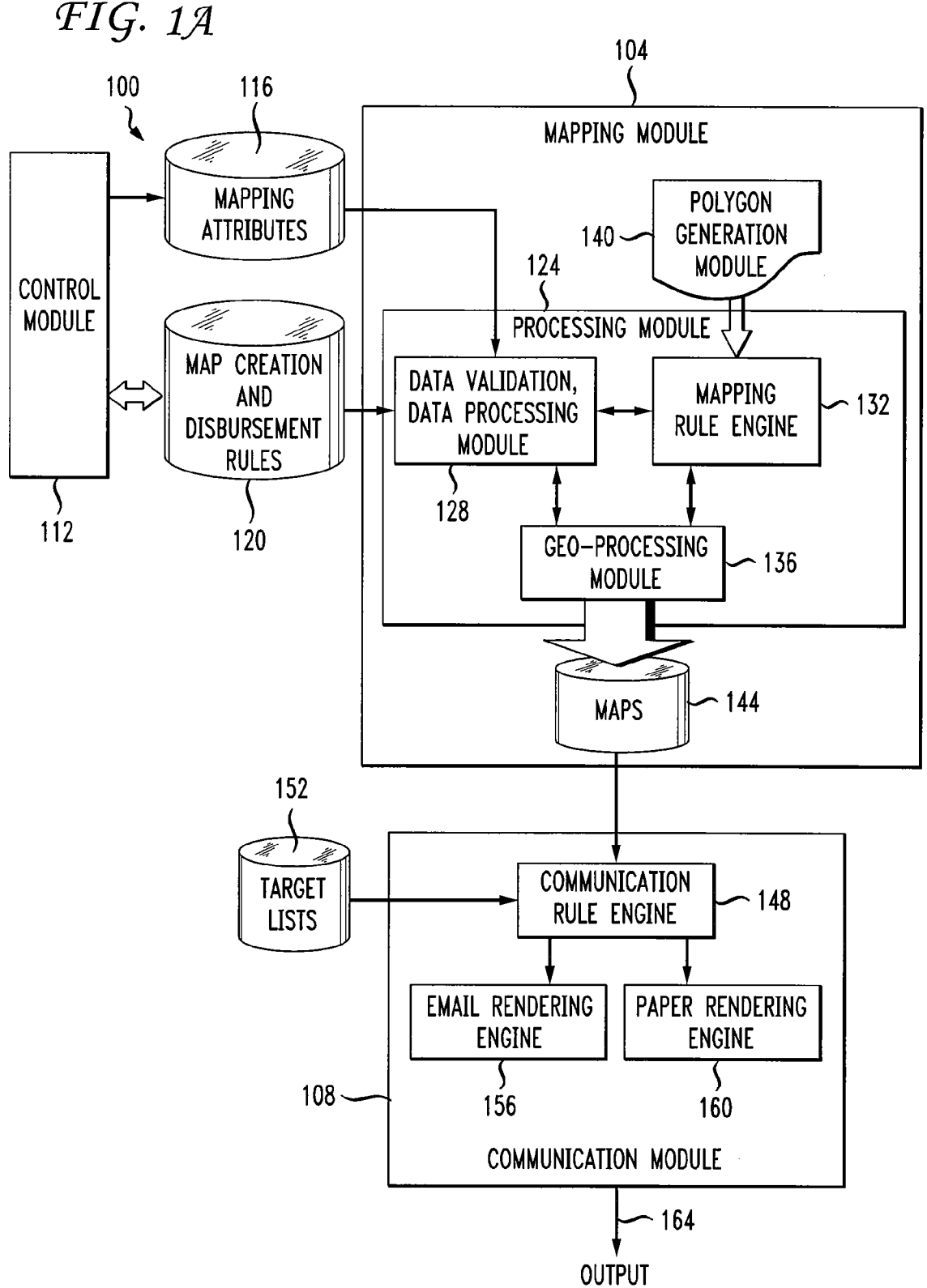
FIG. 1A is a block diagram of a map generation system used to generate customized maps in accordance with an embodiment of the present invention.

FIG. 1A is a block diagram of a map generation system 100 used to generate customized maps (e.g., textual maps, geographic maps, or tables). The system 100 includes a mapping module 104 and a communication module 108. The mapping module 104 is the module responsible for generating customized maps. The communication module 108 is responsible for communicating the customized map(s) to particular recipients. The map generation system 100 enables customization of maps using one or more rules. In particular, the rules are used to guide and control the customization of a map to a characteristic of a recipient or group of recipients. In one embodiment, the rules enable a user without programming knowledge to adjust the customization of a map. A rule can specify how to create a customized map and/or a characteristic of a recipient to which the map will be delivered.

An example of a rule is to color a specific area code and/or zip code on a map a particular color. A user of the system 100 inputs a map creation rule stating that maps created for recipients who live in State A should color the towns associated with area code 123 a specific color (e.g., to represent a particular price for dialing someone in area code 123).

The rules are input into the system 100 via a control module 112. The rules can also be edited via the control module 112. In one embodiment, the control module 112 also enables a user to input marketing content, such as presentations and customer lists, into the system 100 for use in creating customized maps.

The control module 112 stores these rules in a map creation and disbursement rules database 120. The map creation and disbursement rules database 120 may also store rules associated with the disbursements associated with a map. For example, the map creation and disbursement rules database 120 maintains a collection of data needed to create custom maps, such as customers' addresses, postal codes, and telephone numbers. The disbursement of a map refers to how customized maps are disbursed to potential target recipients. Some sample rules include 1) send both printed copy on glossy paper and email to recipients with sales potential of more than certain limits, and 2) send email reminders within certain days of original map sent date for recipients who have not responded in certain days.

The control module 112 is also in communication with a mapping attributes database 116. The mapping attributes database 116 is a database that stores mapping attributes, such as a map's color, size, location on a page, etc.

The mapping module 104 generates a customized map for particular recipients. The mapping module 104 includes a processing module 124 that processes the data received from the control module 112. The processing module 124 also includes a data validation and data processing module 128 in communication with a mapping rule engine 132. Both of these modules 128, 132 are in communication with a geo-processing block 136.

The mapping module 104 receives input about the customizable map(s) from the mapping attributes database 116 and the map creation and disbursement rules database 120. Specifically, the mapping attributes stored in the mapping attributes database 116 are transmitted to the data validation and data processing module 128. Similarly, the map creation and disbursement rules are transmitted to the data validation and data processing module 128. The data validation and data processing module 128 processes and/or validates the data that the module 128 receives. The data validation includes validating and normalizing address information. The resulting address needs to be geo-coded (i.e., the process of finding the exact coordinates in terms of, for instance, latitude and longitude).

The mapping module 104 also includes a polygon generation module 140. The polygon generation module 140 generates polygons for the map(s). The polygon generation module 140 transmits the generated polygon(s) to the mapping rule engine 132 for use in generating the map. In one embodiment, the polygon generation module 140 generates boundary lines for the map.

The geo-processing module 136 receives input from the data validation and data processing module 128 as well as the mapping rule engine 132. The geo-processing module 136 paints each layer of geo elements (e.g., lines, points, filled polygons, etc.) according to their corresponding geo coordinates (e.g., latitude or longitude) based on the maps rules specified. The output of the geo-processing module 136 is a customized map that is stored in a maps database 144.

The maps database 144 provides its output to the communication module 108. In particular, the customized output of the maps database 144 is transmitted to a communication rule engine 148.

The communication rule engine 148 requests and receives information about one or more recipients (e.g., individuals or companies) associated with a predetermined characteristic from a target lists database 152. The characteristic can be any attribute of the recipient. The recipient lists stored in target lists database 152 are generated from a variety of sources, such as from existing enterprise systems, from users of the system 100, from third parties, etc. Data mining techniques, such as scoring or segmentation, are also used on the target lists database 152 to retrieve particular recipients from the lists. As described above, the predetermined characteristics may include location data, revenue, product ownership, customer status, tenure with a particular company, organization, payment status, credit rating, whether the recipient(s) have responded to previously communicated material, etc.

The communication rule engine 148 then determines whether to transmit the customized map to the recipients having a predetermined characteristic via email using an email rendering engine 156 or via paper using a paper rendering engine 160. The communication module 108 then produces output 164. Output 164 may be one or more emails with the maps as an attached document (or part of the email) or may be one or more printouts of the map. The output 164 can be, for example, emails, collaterals, brochures, textual materials, image and video information, etc.

Figure 1B:
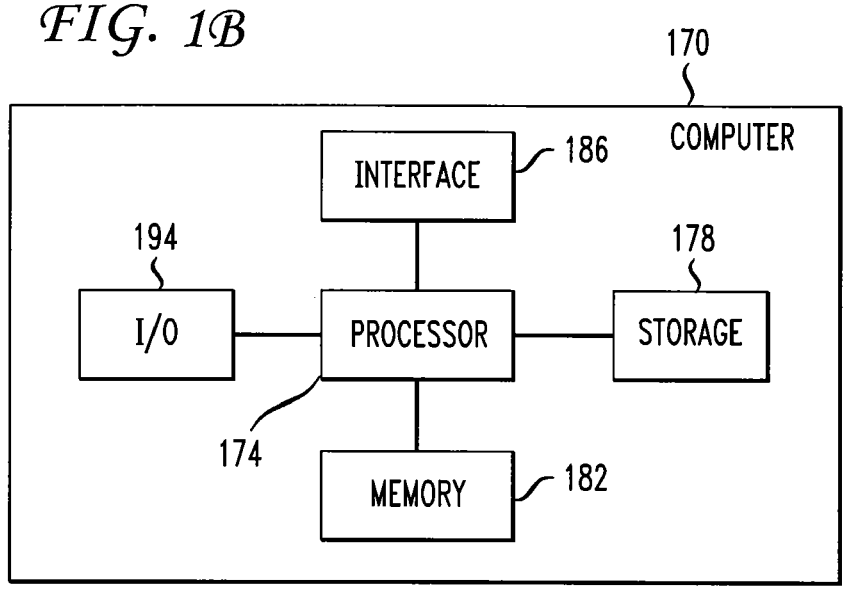
FIG. 1B shows a high level block diagram of a computer system which may be used in an embodiment of the present invention.

The previous and following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 1B. Computer 170 contains a processor 174 which controls the overall operation of computer 170 by executing computer program instructions which define such operation. The computer program instructions may be stored in a storage device 178 (e.g., magnetic disk) and loaded into memory 182 when execution of the computer program instructions is desired. Computer 170 also includes one or more interfaces 186 for communicating with other devices (e.g., locally or via a network). Computer 170 also includes input/output 194 which represents devices which allow for user interaction with the computer 170 (e.g., display, keyboard, mouse, speakers, buttons, etc.). The computer 170 can represent, for example, the mapping module 104, the communication module, and/or the control module.

One skilled in the art will recognize that an implementation of an actual computer will contain other components as well, and that FIG. 1B is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

Figure 2:
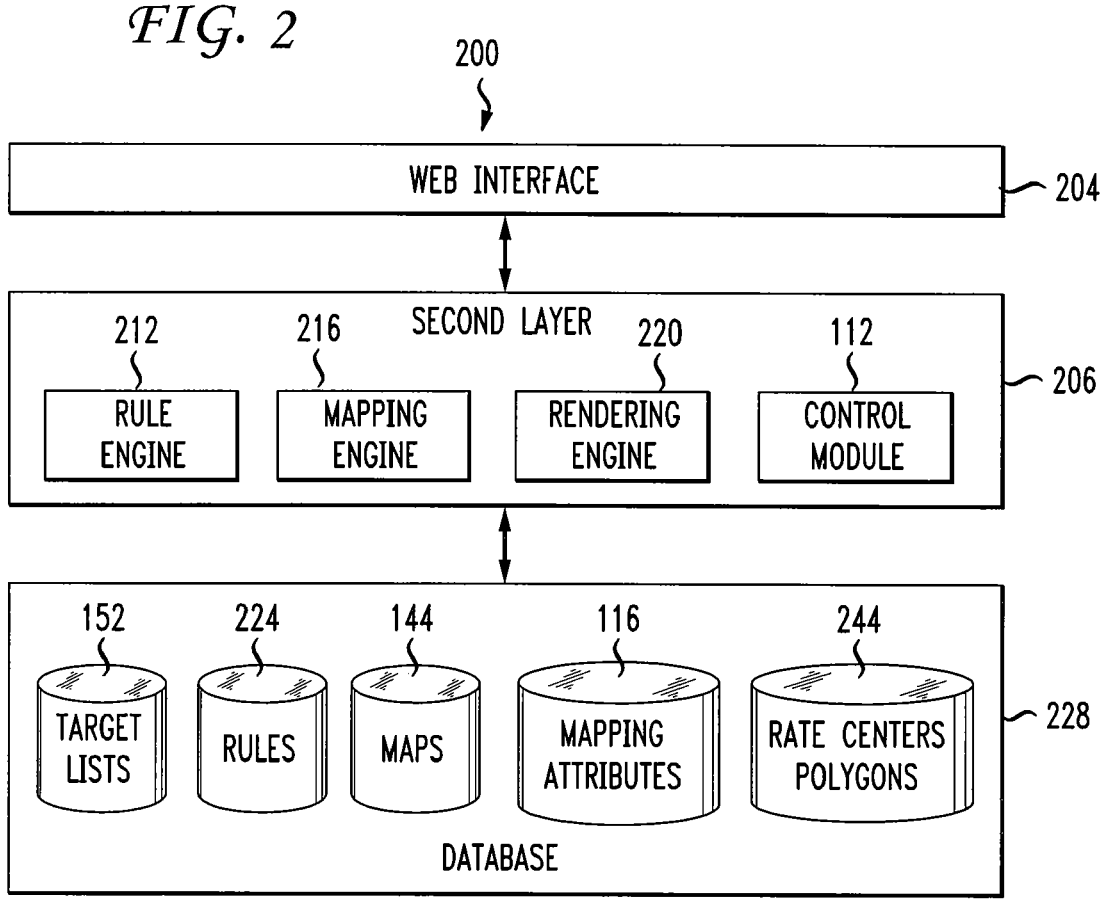
FIG. 2 shows a block diagram of a software architecture used to generate customized maps in accordance with an embodiment of the present invention.

FIG. 2 shows a block diagram of a software architecture 200 used to generate customized maps in accordance with an embodiment of the present invention. The components of the software architecture 200 provide flexibility, scaling, and extensibility to media. Recipients may be automatically profiled and maps disseminated according to customizable rules. Moreover, the architecture 200 can receive responses from the recipients regarding a map. The architecture 200 enables the tracking and monitoring of how effective a map is at communicating what the map intends to communicate based on responses received from recipients.

The software architecture 200 facilitates the automatic generation of custom maps. In particular, the software architecture 200 automatically profiles recipients from a target list. This profiling is subject to programmable rules.

The software architecture 200 includes a web interface 204. The web interface 204 enables a user of the architecture 200 to provide rules to the architecture 200 and/or to provide instructions as to what characteristic to search for. The web interfaces 204 communicate with a second layer 206 of software. The second layer 206 of software includes the control module 208. As described above, the control module 208 enables input of and editing of textual marketing content used in the creation of customized map(s).

The second layer 206 of software also includes a rule engine 212, a mapping engine 216, and a rendering engine 220. The rule engine 212 processes rules to facilitate the generation of one or more custom maps. The rules can be provided as input or can be retrieved from a rules database 224. The mapping engine 216 generates custom maps from the rules and the characteristics. The rendering engine 220 facilitates the rendering of the map into a paper format or an email. In one embodiment, one or more of the components in the second layer 206 of software are combined into a single module.

One or more of these engines communicate with one or more databases 228. The databases 228 include the rules database 224, a target lists database 232, a maps database 236, a mapping attributes database 240, and a rate centers polygons database 244. The mapping engine 216 communicates with the rate centers polygons database 244 to enable the generation of a map that provides information to users on how pricing information varies geographically for a particular product/service. The rules used by the rule engine 212 may be associated with recipients stored in the target lists database 232. In one embodiment, the mapping engine 216 uses the mapping attributes database 240 to obtain attributes for a particular map, such as its shape, color, line width, etc. One or more of these databases can be combined into a single database.

The software architecture 200 may also increase marketing effectiveness. The architecture 200 enables recipients of the map(s) to provide input regarding the map(s). This input may be what the recipient thought of the map, how well the map portrayed its areas of interest, how well the map was customized to the particular recipient, etc.

Figure 3:
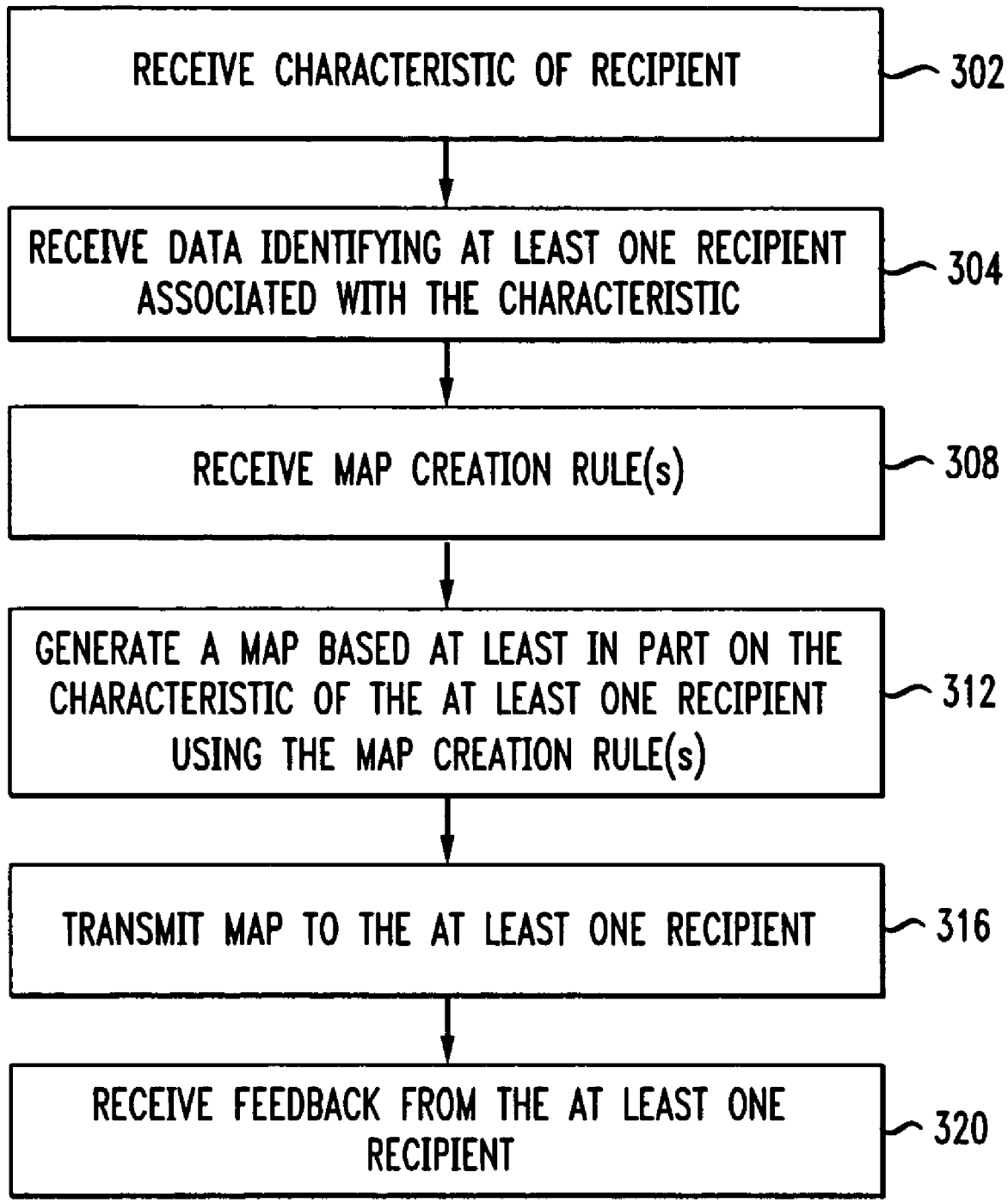
FIG. 3 is a flowchart showing the steps performed by the map generation system to generate customized maps.

FIG. 3 shows the steps performed by the map generation system to generate customizable maps. First, the map generation system receives a characteristic of at least one recipient that the user would like to customize a map to in step 302. The map generation system then identifies at least one recipient associated with a characteristic in step 304. In one embodiment, the map generation system searches its database(s) for recipient(s) associated with (e.g., having or not having) the characteristic.

The map generation system may then receive one or more map creation rules in step 308. These map creation rules can be, for example, rules designating how the map is to be formed. An example rule is that the map has all areas in which calls cost more than $X per minute colored yellow on the map.

The map generation system then, in step 312, generates a map based at least in part on the characteristic using the received map creation rule. The map generation system then transmits the map to the at least one recipient having the characteristic in step 316. The map generation system may then receive feedback in step 320 from the at least one recipient about the customized map.

FIG. 4 is a diagram of a customized map output 400 provided by the map generation system. In one embodiment, the customized map output 400 includes one or more of a map 404, a letter 408 describing the map 404, and a table 412.

The letter 404 describes the map and, in one embodiment, the table. The map 404 is a map customized for Customer A. For example, the map 404 may focus on a particular area that Customer A has local wireless calls from. The table 412 lists the area codes, local exchanges, and towns associated with the map 404 (and, for example, associated with Customer A's local calling area).

For example, the table 412 indicates that the map 404 includes area code 530 and local exchange 766. This corresponds with Sacramento. Thus, Customer A can make a local call to Sacramento.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating a map comprising:
  receiving, from a database, data identifying a plurality of recipients associated with predetermined characteristics including an area code and customer status of the plurality of recipients;
  generating the map identifying an area where the plurality of recipients are configured to use wireless calling covered by a local calling plan, the map being generated based at least on the predetermined characteristics of the plurality of recipients using a programmable rule and a creation rule identifying a first portion of the map having a cost different than a second portion of the map based on a cost indicator;
  generating a letter describing the map and providing information about placing a call covered by the local calling plan;
  transmitting the letter to each of the plurality of recipients;
  monitoring the effectiveness of the map based on an automatic profiling of the plurality of recipients including receiving responses from the plurality of recipients regarding the map, the responses comprising how well the map portrayed areas of interest and how well the map was customized; and
  searching the database for the data identifying the plurality of recipients associated with the predetermined characteristics.

2. The method of claim 1 wherein the predetermined characteristics further include at least one of revenue, product ownership, tenure with a particular company, organization, payment status, credit rating, and responses to previously communicated material.

3. The method of claim 1 further comprising generating a polygon for use in the map.

4. The method of claim 1 further comprising receiving a communication regarding the map from the plurality of recipients.

5. The method of claim 1 further comprising receiving a rule used to generate the map.

6. A system configured to generate a map comprising:
  a database configured to store a list of a plurality of recipients and characteristics associated with the plurality of recipients; and
  a processor for executing stored computer program instructions and configured to implement:
    a control module configured to receive the characteristics associated with the plurality of recipients, the characteristics including an area code and customer status of the recipient, and receive responses from the plurality of recipients regarding the map and information to monitor the effectiveness of the map based on an automatic profiling of the plurality of recipients, the responses comprising how well the map portrayed areas of interest and how well the map was customized;
    a rule engine configured to generate the map identifying an area where the plurality of recipients is configured to use wireless calling covered by a local calling plan based on a creation rule identifying a first portion of the map having a cost different than a second portion of the map based on a cost indicator, generate a letter describing the map based at least on the characteristics associated with the plurality of recipients using programmable rules and providing information about placing a call covered by the local calling plan;

a communication module configured to transmit the letter to the plurality of recipients;

a map creation and disbursement rules database in communication with the control module and configured to store data associated with creation of the map; and a mapping attributes database in communication with the control module and configured to store attributes of the map.

7. The system of claim 6 wherein the rule engine further comprises a data validation and data processing module configured to validate and process data associated with the map.

8. The system of claim 7 further comprising a polygon generation module configured to generate a polygon for the map.

9. The system of claim 8 wherein the rule engine further comprises a mapping rule engine in communication with the polygon generation module and the data validation and data processing module and configured to generate the map based on the polygon and the data.

10. The system of claim 6 wherein the rule engine further comprises a geo-processing module configured to identify each layer of geo elements according to their corresponding geo coordinates.

11. The system of claim 6 further comprising a maps database for storing the map generated by the rule engine.

12. The system of claim 6 wherein the communication module further comprises an email rendering engine configured to deliver the map via email and a paper rendering engine configured to deliver the map via paper.

13. The system of claim 6 wherein the characteristics further include at least one of revenue, product ownership, tenure with a particular company, organization, payment status, credit rating, and responses to previously communicated material.

14. A system configured to generate a map comprising:

means for receiving, from a database, data identifying a plurality of recipients associated with predetermined characteristics including an area code and customer status of the plurality of recipients;

a processor for generating the map identifying an area where the plurality of recipients are configured to use wireless calling covered by a local calling plan, the map being generated based at least on the predetermined characteristics of the plurality of recipients using a programmable rule and a creation rule identifying a first portion of the map having a cost different than a second portion of the map based on a cost indicator; and means for generating a letter describing the map and providing information about placing a call covered by the local calling plan;

means for transmitting the letter to each of the plurality of recipients;

means for monitoring the effectiveness of the map based on an automatic profiling of the plurality of recipients including receiving responses from the plurality of recipients regarding the map, the responses comprising how well the map portrayed areas of interest and how well the map was customized; and means for searching the database for the data identifying the plurality of recipients associated with the predetermined characteristics.

15. The system of claim 14 wherein the predetermined characteristics further include at least one of revenue, product ownership, tenure with a particular company, organization, payment status, credit rating, and responses to previous material.

16. The system of claim 14 further comprising means for generating a polygon for use in the map.

17. The system of claim 14 further comprising means for receiving a communication regarding the map from the plurality of recipients.

18. The system of claim 14 further comprising means for receiving a rule used to generate the map.

* * * * *